"(12) United States Patent
Bailey

(10) Patent No.: US 7,580,732 B2
(45) Date of Patent: Aug. 25, 2009

(54) SUBSCRIBER AGGREGATED POWER

(75) Inventor: George R. Bailey, Gaithersburg, MD (US)

(73) Assignee: Spirent Communications of Rockville, Inc., Rockville, MD (US)

( * ) Notice: Subject to any disclaimer, the term of this patent is extended or adjusted under 35 U.S.C. 154(b) by 393 days.

(21) Appl. No.: 11/242,922

(22) Filed: Oct. 5, 2005

(65) Prior Publication Data
US 2006/0203997 A1 Sep. 14, 2006

Related U.S. Application Data

(60) Provisional application No. 60/615,579, filed on Oct. 5, 2004.

(51) Int. Cl.
H04B 1/38 (2006.01)
(52) U.S. Cl. .................. 455/572; 455/103; 455/402; 455/522; 370/216; 370/218; 370/463; 375/222; 375/275; 379/93.06; 379/93.09; 379/413; 700/22; 700/286; 713/300
(58) Field of Classification Search ............... 455/127, 455/522, 103, 402, 572; 379/93.09, 399.01, 379/413, 93.36, 348, 90.1, 93.06, 102.04, 379/279, 322, 377; 370/200, 542, 216, 463, 370/494; 307/19, 45, 64, 69; 375/222, 275; 700/22, 286, 295, 297; 713/300, 320, 340
See application file for complete search history.

(56) References Cited

U.S. PATENT DOCUMENTS 3,835,334 A * 9/1974 Notteau ................. 307/69
4,099,036 A * 7/1978 Migeon ................. 340/425.2
6,005,873 A * 12/1999 Amit ..................... 370/494
6,393,105 B1 * 5/2002 Beveridge ............. 379/56.2
6,510,204 B2 * 1/2003 De Clercq et al. ....... 379/28
6,665,404 B2 * 12/2003 Cohen ................... 379/413
6,847,718 B1 * 1/2005 Hiraoka ................. 379/413
6,879,052 B1 * 4/2005 Johnson ................. 290/1 A
6,973,394 B2 * 12/2005 Jaeger et al. ............ 702/64
6,992,404 B2 * 1/2006 Priest .................... 307/80
7,317,793 B2 * 1/2008 Binder et al. ........... 379/413
2003/0178979 A1 * 9/2003 Cohen ................... 323/282
2004/0230324 A1 * 11/2004 Haselsteiner ........... 700/22

* cited by examiner

Primary Examiner—Nay A Maung
Assistant Examiner—Paul P Tran
(74) Attorney, Agent, or Firm—Gilberto M. Villacorta; Phillip J. Articola; Foley & Lardner LLP

(57) ABSTRACT

A system for supplying power in a communication network includes a network element and a plurality of subscriber devices in communication with the network element. Each of the plurality of subscriber devices is configured to communicate with the network element via a respective communication line, each of the plurality of subscriber devices includes a power supply for supplying power to the subscriber device. Each subscriber device of at least a subset of the plurality of subscriber devices includes a power transmission circuit in communication with the respective power supply. The power transmission circuit is configured to transmit a portion of the power supplied by the power supply of the subscriber device to the network element via the respective communication line. The portions of power supplied from the at least subset of the plurality of subscriber devices are aggregated to provide power for the network element.

23 Claims, 3 Drawing Sheets

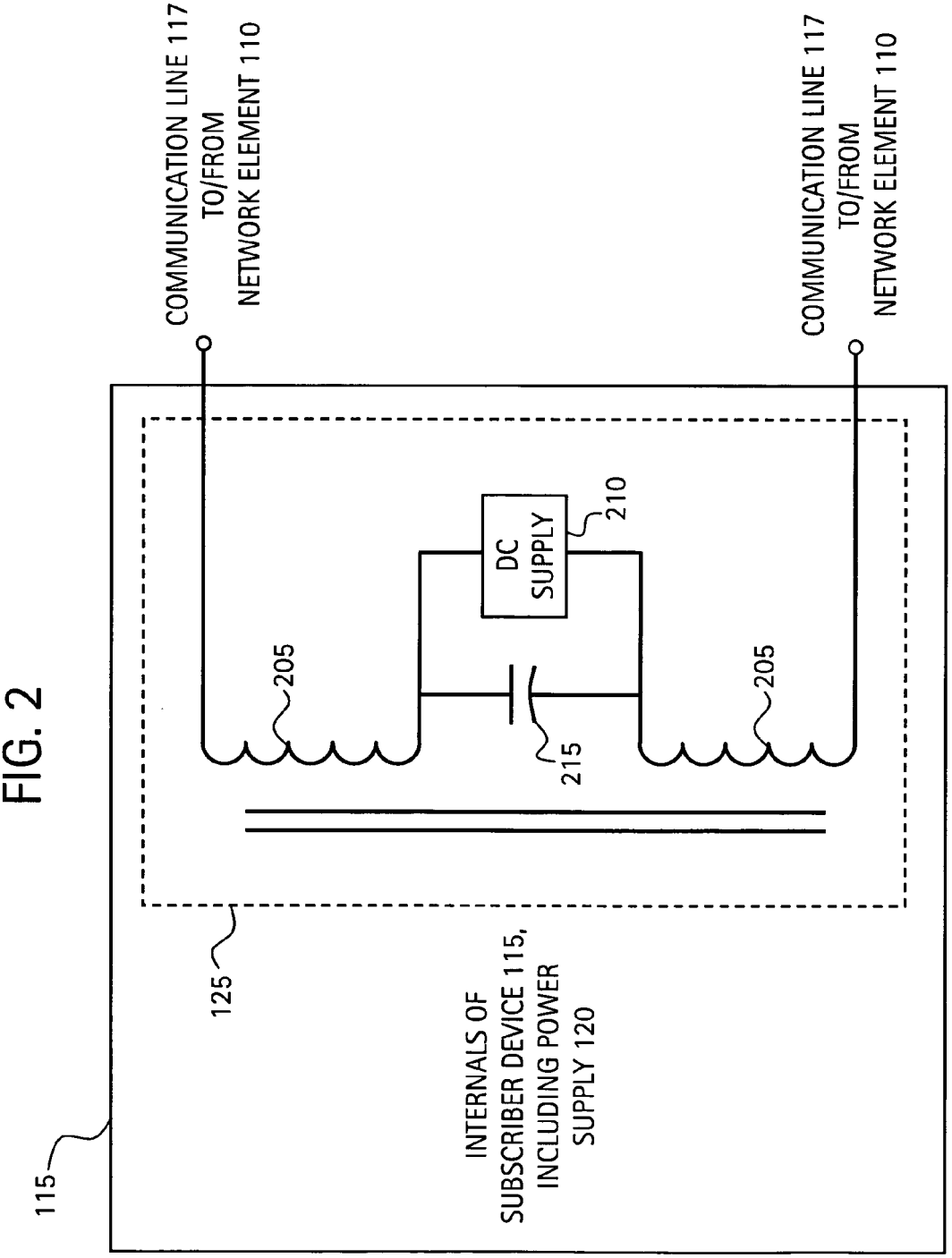

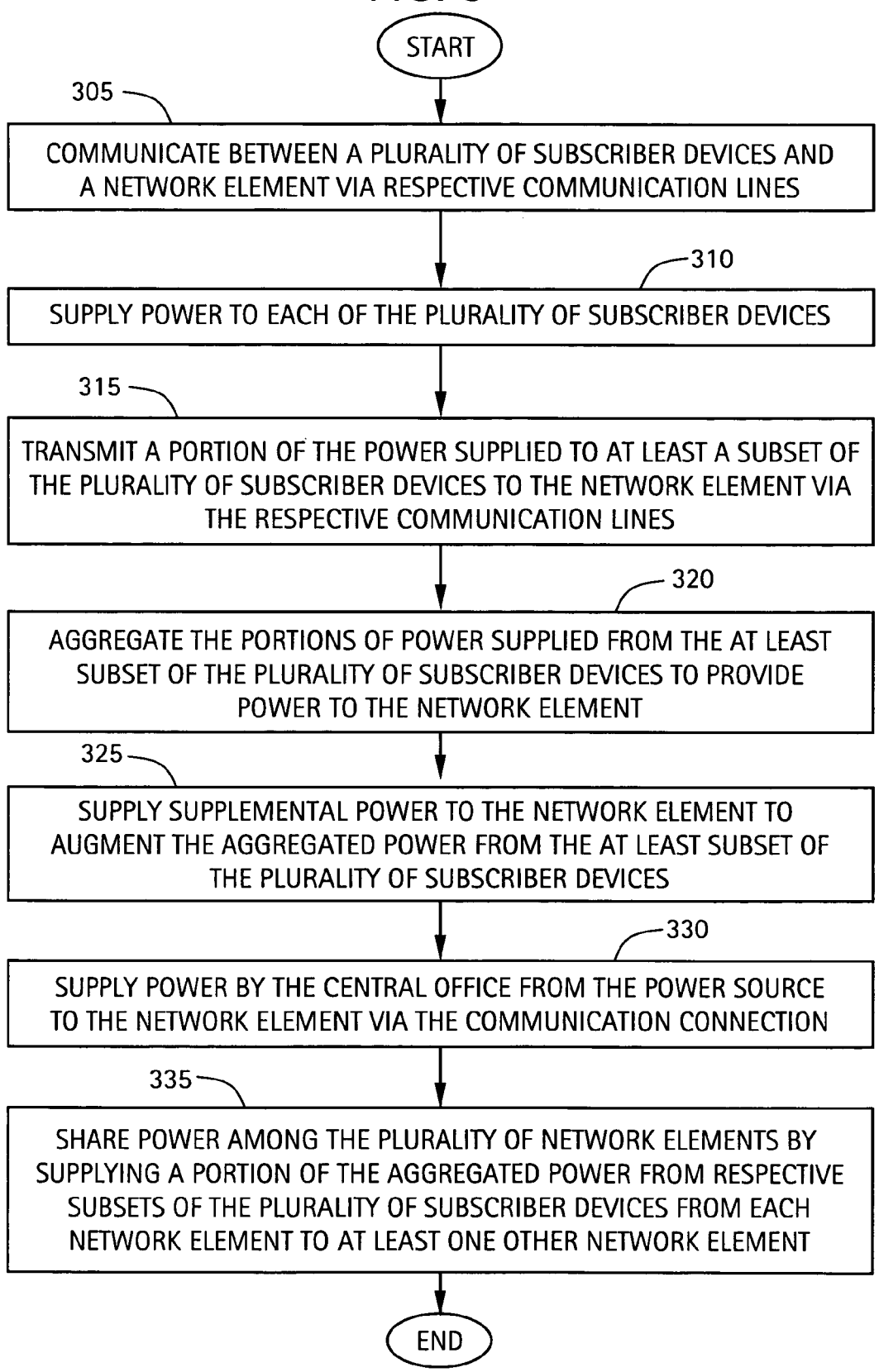

SUBSCRIBER AGGREGATED POWER

This application claims priority under 35 U.S.C. § 119(e) to U.S. Provisional Application No. 60/615,579, filed on Oct. 5, 2004, the entire contents of which are hereby incorporated by reference herein.

BACKGROUND

1. Field of the Invention

The present invention relates to telecommunication systems. More particularly, the present invention relates to a system and method for providing aggregated power from a plurality of subscriber devices via respective communication lines to a network element for powering the network element.

2. Background Information

Public telecommunication systems include subscribers who are coupled to a telecommunications network with a twisted pair wire loop, commonly known as a subscriber loop. Digital transmission systems based on local subscriber loops are generally called Digital Subscriber Loops (DSLs). Line codes of various formats are used to convey digital data over existing twisted-pair copper telephone lines connecting the telephone company Central Office (CO) to subscribers. Conventional DSL data modems are designed to provide service to a percentage of customers at a prescribed data rate. As used herein, the term "xDSL" refers to the different variants of DSL technologies for transmitting high-bandwidth information over twisted-pair (i.e., copper wire) telephone lines, including, for example, Asymmetric Digital Subscriber Line (ADSL), including Asymmetric Digital Subscriber Line Version 2 ADSL2) and Asymmetric Digital Subscriber Line Version 2+ (ADSL2+), All Digital Loop ADSL (ADL ADSL), Symmetric Digital Subscriber Line (SDSL), High Bit-rate Digital Subscriber Line (HDSL), Very High Bit-rate Digital Subscriber Line (VDSL), Rate Adaptive Digital Subscriber Line (RADSL), Universal Digital Subscriber Line (UDSL), Consumer Digital Subscriber Line (CDSL), G.Lite (an easier-to-install form of ADSL, also referred to as splitterless ADSL) or DSL Lite (another acronym used for an easier-to-install form of ADSL, or splitterless ADSL), Integrated Services Digital Network Digital Subscriber Line (IDSL), and any other variant of DSL, such as, for example, Error Correction Asymmetric Digital Subscriber Line (EC-ADSL), Single-Pair High-Speed Digital Subscriber Line (SHDSL), Enhanced Single-Pair High-Speed Digital Subscriber Line (ESHDSL), 10 Mb/s Digital Subscriber Line (10MDSL), Multi-Megabit Digital Subscriber Line (M2DSL), Broadband Digital Subscriber Line (BDSL), and Multi-Megabit Multi-loop DSL (MMDSL).

To interconnect multiple xDSL users to a high-speed backbone network, the telephone company can use various types of network equipment, such as, for example, a Digital Subscriber Line Access Multiplexer (DSLAM). The DSLAM can connect to, for example, an asynchronous transfer mode (ATM) network that can aggregate data transmission at gigabit data rates. At the other end of each transmission, the DSLAM demultiplexes the signals and forwards them to appropriate individual xDSL connections (subscribers). Traditionally, such network equipment has been powered from the CO, as a result of the historical telecommunication network architecture of large, but fairly sparse, concentrations of equipment housed in the COs. However, the CO is evolving from a telecommunications transport hub into a business and management center for a highly diffuse and interconnected network of comparatively numerous, small and remote transport hubs (network elements such as, for example, Remote Terminals or RTs).

Conventionally, the RTs have been powered by a local utility drop, i.e., a power feed from the electric utility company (e.g., via a connection to a power line, wall outlet or the like) to the RT. However, such a configuration requires the need to negotiate, pay for the installation of, and support monthly charges for the local utility drop to the RT.

An alternative to a local utility drop for supplying power to remote equipment, such as RTs, is the use of loop powering from the CO. Such a loop powering scheme typically entails running between one and 24 subscriber loops from the serving CO to the RT, and using at least one of the subscriber loops to provide the subject RT with, for example, a 60 milliamp current source with an open circuit voltage of as much as 350 volts (+/−approximately 175 volts relative to earth). Such a loop powering scheme is very inefficient, as up to 50% of the supplied power can be lost in transit. Such a loop powering scheme also results in the loss of pair use and decreased bandwidth, as the subscriber loop pair being used for powering the RT is not used for communication. Additionally, concomitant safety issues result from the high voltages involved, e.g., for the workers who have to service the RTs being supplied with such high voltages.

For given receiver noise conditions, higher channel capacity over copper pairs is achieved primarily by limiting length, and employing as large a gauge wire as possible. For a given maximum operating voltage, the same factors can contribute to increased power transport capability. However, the closer the RTs are moved to the subscriber to improve service bandwidth, in general, the farther it is between the serving CO and the RT. Consequently, the problem of delivering more power from the CO to broader bandwidth equipment is compounded.

SUMMARY OF THE INVENTION

A system and method are disclosed for supplying power in a communication network. In accordance with exemplary embodiments of the present invention, according to a first aspect of the present invention, a system for supplying power in a communication network includes a network element. The system includes a plurality of subscriber devices in communication with the network element. Each of the plurality of subscriber devices is configured to communicate with the network element via a respective communication line, each of the plurality of subscriber devices includes a power supply for supplying power to the subscriber device. Each subscriber device of at least a subset of the plurality of subscriber devices includes a power transmission circuit in communication with the respective power supply. The power transmission circuit is configured to transmit a portion of the power supplied by the power supply of the subscriber device to the network element via the respective communication line. The portions of power supplied from the at least subset of the plurality of subscriber devices are aggregated to provide power for the network element.

According to the first aspect, the system can include at least one supplemental power supply in electrical communication with the network element. The at least one supplemental power supply can be configured to supply power to the network element to augment the aggregated power from the at least subset of the plurality of subscriber devices. The network element can be in communication with a central office via a communication connection. The at least one supplemental power supply can comprise a power source associated with the central office. The central office can be configured to supply power from the power source to the network element via the communication connection. The system can include a plurality of network elements in electrical communication with each other. Each network element can be in communication with a respective plurality of subscriber devices. Each network element can be configured to supply a portion of the aggregated power from respective subsets of the plurality of subscriber devices to at least one other network element to share power among the plurality of network elements. According to an exemplary embodiment of the first aspect, the network element can comprise, for example, a remote terminal. Each of the plurality of subscriber devices can comprise, for example, at least one of a set-top box, a modem, and a subscriber network interface device.

According to a second aspect of the present invention, a system for supplying power to a network device in a telecommunication network includes a plurality of subscriber elements in communication with the network device. Each of the plurality of subscriber elements is configured to communicate telecommunication signals with the network device via respective communication lines. Each of the plurality of subscriber elements includes a power source for supplying power to the subscriber element. Each subscriber element of at least a subset of the plurality of subscriber elements includes a power transmitter circuit in communication with the respective power source. The power transmitter circuit is configured to transmit a portion of the power supplied by the power source of the subscriber element to the network device over the respective communication line. The portions of power supplied from the at least subset of the plurality of subscriber elements are aggregated to provide power to the network device.

According to the second aspect, the system can include at least one additional power supply in electrical communication with the network device. The at least one additional power supply can be configured to supply power to the network device to augment the aggregated power from the at least subset of the plurality of subscriber elements. The network device can be in communication with a central facility via a communication connection. The at least one additional power supply can comprise a power supply associated with the central facility. The central facility can be configured to supply power from the power supply associated with central facility to the network device via the communication connection. The system can include a plurality of network devices in electrical communication with each other. Each network device can be in communication with a respective plurality of subscriber elements. Each network device can be configured to supply a portion of the aggregated power from respective subsets of the plurality of subscriber elements to at least one other network device to distribute power among the plurality of network devices. According to an exemplary embodiment of the second aspect, the network device can comprise, for example, a remote terminal. Each of the plurality of subscriber elements can comprise, for example, at least one of a set-top box, a modem, and a subscriber network interface device.

According to a third aspect of the present invention, a system for supplying power in a communication network includes means for networking. The system includes a plurality of means for communicating with the network element. Each of the plurality of communicating means is configured to communicate with the networking means via a respective communication line. Each of the plurality of communicating means includes means for supplying power to the communicating means. Each communicating means of at least a subset of the plurality of communicating means includes means for transmitting power in communication with the respective power supplying means. The power transmitting means is configured to transmit a portion of the power supplied by the power supplying means of the communicating means to the networking means via the respective communication line. The portions of power supplied from the at least subset of the plurality of communicating means are aggregated to provide power for the networking means.

According to the third aspect, the system can include at least one supplemental means for supplying power in electrical communication with the networking means. The at least one supplemental power supplying means can be configured to supply power to the networking means to augment the aggregated power from the at least subset of the plurality of communicating means. The networking means can be in communication with a central office via a communication connection. The at least one supplemental power supplying means can comprise a power source means associated with the central office. The central office can be configured to supply power from the power source means to the networking means via the communication connection. The system can include a plurality of networking means in electrical communication with each other. Each networking means can be in communication with a respective plurality of communicating means. Each networking means can be configured to supply a portion of the aggregated power from respective subsets of the plurality of communicating means to at least one other networking means to share power among the plurality of networking means. According to an exemplary embodiment of the third aspect, the networking means can comprise, for example, a remote terminal means. Each of the plurality of communicating means can comprise, for example, at least one of a set-top box means, a modem means, and a subscriber network interface device means.

According to a fourth aspect of the present invention, a system for supplying power to a network device in a telecommunication network includes a plurality of means for communicating with the network device. Each of the plurality of communicating means is configured to communicate telecommunication signals with the network device via respective communication lines. Each of the plurality of communicating means includes means for supplying power to the communicating means. Each communicating means of at least a subset of the plurality of communicating means includes means for delivering power in communication with the respective power supplying means. The power delivering means is configured to transmit a portion of the power supplied by the power supplying means of the communicating means to the network device over the respective communication line. The portions of power supplied from the at least subset of the plurality of communicating means are aggregated to provide power to the network device.

According to the fourth aspect, the system can include at least one additional means for providing power in electrical communication with the network device. The at least one additional power providing means can be configured to supply power to the network device to augment the aggregated power from the at least subset of the plurality of communicating means. The network device can be in communication with a central facility via a communication connection. The at least one additional power providing means can comprise a power supply means associated with the central facility. The central facility can be configured to supply power from the power supply means associated with central facility to the network device via the communication connection. The system can include a plurality of network devices in electrical communication with each other. Each network device can be in communication with a respective plurality of communicating means. Each network device can be configured to supply a portion of the aggregated power from respective subsets of the plurality of communicating means to at least one other network device to distribute power among the plurality of network devices. According to an exemplary embodiment of the fourth aspect, the network device can comprise, for example, a remote terminal. Each of the plurality of communicating means can comprise, for example, at least one of a set-top box, a modem, and a subscriber network interface device.

According to a fifth aspect of the present invention, a method of supplying power in a communication network includes the step of: a.) communicating between a plurality of subscriber devices and a network element via respective communication lines; b.) supplying power to each of the plurality of subscriber devices; c.) transmitting a portion of the power supplied to at least a subset of the plurality of subscriber devices to the network element via the respective communication lines; and d.) aggregating the portions of power supplied from the at least subset of the plurality of subscriber devices to provide power to the network element.

According to the fifth aspect, the method can include the step of: e.) supplying supplemental power to the network element to augment the aggregated power from the at least subset of the plurality of subscriber devices. The network element can be in communication with a central office via a communication connection. The supplemental power supplied in step (e) can comprise a power source associated with the central office. The method can include the step of: f.) supplying power by the central office from the power source to the network element via the communication connection. A plurality of network elements can be in electrical communication with each other. Each network element can be in communication with a respective plurality of subscriber devices. The method can include the step of: g.) sharing power among the plurality of network elements by supplying a portion of the aggregated power from respective subsets of the plurality of subscriber devices from each network element to at least one other network element. According to an exemplary embodiment of the fifth aspect, the network element can comprise, for example, a remote terminal. Each of the plurality of subscriber devices can comprise, for example, at least one of a set-top box, a modem, and a subscriber network interface device.

BRIEF DESCRIPTION OF THE DRAWINGS

Other objects and advantages of the present invention will become apparent to those skilled in the art upon reading the following detailed description of preferred embodiments, in conjunction with the accompanying drawings, wherein like reference numerals have been used to designate like elements, and wherein:

FIG. 2 is a diagram illustrating a power transmission circuit of a subscriber device, in accordance with an exemplary embodiment of the present invention.

FIG. 3 is a flowchart illustrating steps for supplying power in a communication network, in accordance with an exemplary embodiment of the present invention.

DETAILED DESCRIPTION OF THE PREFERRED EMBODIMENTS

Figure 1:
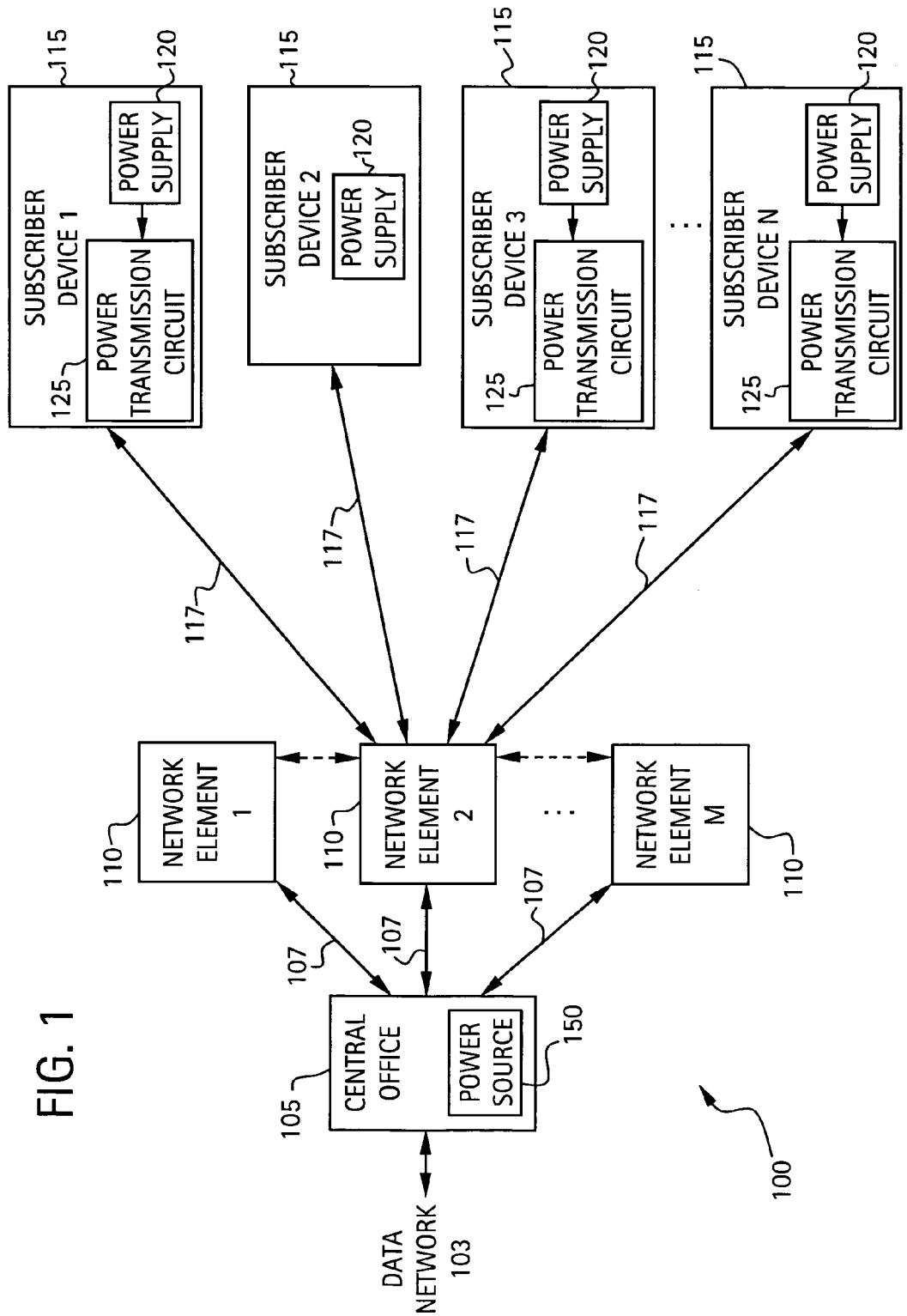
FIG. 1 is a diagram illustrating a system for supplying power in a communication network, in accordance with an exemplary embodiment of the present invention.

Exemplary embodiments of the present invention are directed to a system and method for supplying power in a communication network. For combined telecommunication services (e.g., video-on-demand, internet, and telephone (e.g., voice over internet protocol (VoIP) or emulated Plain Old Telephone System (POTS))) and the like, the customer or subscriber can have a set-top box, modem or other network terminator or any combination thereof (collectively referred to herein as a "set-top box") for receiving or otherwise providing such combined services to the subscriber. Such a set-top box can be powered by a wall-outlet transformer (a so-called "wall wart"). According to exemplary embodiments, an additional power transmission circuit can be included in the set-top box to provide a small amount of power (e.g., approximately 5 to approximately 10 watts) supplied from the wall outlet to operate, in aggregation with other subscribers, the proximal common carrier network element, for example, housed in a Remote Terminal (RT). In other words, the network element can be powered from aggregated contributions from individual subscribers that are supplied to the network element, for example, over the same twisted pair through which the combined information service is provided to the subscriber. The aggregated power from the subscribers can be used to power the network element in place of a local utility drop or a loop power feed via one of the subscriber loop pairs from the Central Office (CO) in communication with the network element. According to an alternative exemplary embodiment, the loop power feed from, for example, the CO can be used to augment the aggregated power supplied from the subscribers.

According to exemplary embodiments, such "subscriber aggregated power" can be a diversified, reliable and inexpensive power source for remote network elements. For example, aggregating individual subscriber power contributions can guarantee that the power contributions are distributed across large quantities of high-side, fused, single-phase power distribution transformers (e.g., a 4160/240 volt transformer every 10 or so houses), in turn connected across multiple phases of at least one feeder. Accordingly, with large numbers of subscribers, a loss of a few or even many of the subscribers would not substantially affect the power supplied to the network element. In contrast, a local electrical utility drop requires an initial and continuing cost, powered by one such distribution transformer, on one phase, of one feeder, which, as a result, carries a much more significant risk as a single point of power failure. In addition, by using subscriber aggregated power, deployment of remote equipment, such as network elements or other RTs, need not involve the coordination with, or charges from, an electrical utility.

Furthermore, more power can be available to the network element as more subscribers are added. On average, the available power to the network element rises proportionally with the number of subscribers. Power use typically rises by a ratio somewhat less than proportional for increasing numbers of subscribers, but asymptotically approaches a minimum "keep alive" operating power with no subscribers. Thus, more subscribers result in more available power. As the available power increases, the network element can distribute excess power to other connected network elements to power those elements or distribute the excess power for other uses, such as, for example, back to the CO.

Such subscriber aggregated power can also be safer than powering schemes such as loop powering from the CO. According to an exemplary embodiment, unlike a local utility drop or a typical CO loop powering scheme, safety issues can be avoided by using no more than the SELV limit of 60 volts DC between leads or earth. Power systems that do not exceed 60 volts DC are treated as a SELV circuit. SELV or Safety Extra Low Voltage is defined as a circuit that in normal and single fault condition does not exceed 42.4 volts peak or 60 volts DC. Voltages over 80 volts DC are considered hazardous. CO loop powering schemes can involve open circuit voltages of as much as 350 volts (+/−approximately 175 volts relative to earth). Limiting the maximum available voltage to 60 volts according to one exemplary embodiment does not overly limit power availability, because of the very limited distances involved, and the highly parallel structure between the RT and the served subscribers. In contrast, applying a 60 volt limit on a CO loop powering scheme would not be a feasible constraint.

Additionally, because power is supplied to the remote network element over the shortest distance possible in telecommunication wiring (i.e., between the subscriber and the network element), transport losses can be modest compared with CO loop powering schemes. Thus, for a given equipment power consumption, the power to operate the overall network, irrespective of the point of delivery, can decline.

These and other aspects of the present invention will now be described in greater detail. FIG. 1 is a diagram illustrating system 100 for supplying power in a communication network, in accordance with an exemplary embodiment of the present invention. A CO 105 can be in communication with each of one or more network elements 110 (e.g., network element 1, network element 2, . . . , network element M, where M can be any suitable number) using any suitable form of communication connection 107 (e.g., between one and 24 subscriber loops running from the serving CO 105 to the network element 110, a coaxial cable, or the like). The CO 105 can be any suitable form of switching facility that is capable of connecting the network elements 110 to, for example, a suitable data or other information network 103 (e.g., the internet). As used herein, a "network element" is any suitable form of communication or telecommunication equipment that can provide support or services to a subscriber. For example, according to an exemplary embodiment, the network element 110 can comprise any suitable form of RT or other device capable of providing access or otherwise interfacing to the data network 103 via CO 105.

The system 100 includes a plurality of subscriber devices 115 (e.g., subscriber device 1, subscriber device 2, . . . , subscriber device N, where N can be any suitable number). As used herein, a "subscriber device" is any suitable form of device that is capable of receiving or otherwise providing information to the subscriber from the network element 110. For example, the subscriber device 115 can comprise Customer Premises Equipment (CPE) devices, a set-top box, a modem (e.g., a xDSL or cable modem) or any other suitable type of subscriber device. According to an exemplary embodiment, each of the plurality of subscriber devices 115 can comprise a set-top box, a modem, or a subscriber network interface device, or any combination thereof.

Each network element 110 is in communication with a respective plurality of subscriber devices 115. For purposes of illustration and not limitation, the plurality of subscriber devices 115 illustrated in FIG. 1 (e.g., subscriber device 1, subscriber device 2, . . . , subscriber device N) is in communication with the second network element 110. Each of the plurality of subscriber devices 115 are configured to communicate with the network element 110 via a respective communication line 117 (e.g., a twisted pair, coaxial cable, or the like).

According to exemplary embodiments, each of the plurality of subscriber devices 115 includes a power supply 120 that is configured to supply a suitable amount of power to the subscriber device 115. For example, the power supply 120 can comprise any suitable type of power supply or source capable of supplying the necessary power to the subscriber device 115, such as, for example, a suitable connection to a wall-outlet transformer (a so-called "wall wart") or other appropriate wall-outlet (e.g., 120 V AC at 60 Hz). The power supply 120 can be configured to supply, for example, DC voltage to the subscriber device 115 (e.g., using an appropriate rectifier circuit or device or the like).

Additionally, according to exemplary embodiments, at least a subset of the plurality of subscriber devices 115 includes a power transmission circuit 125 in communication with the respective power supply 120. In other words, any number or all of the subscriber devices 115 can include the power transmission circuit 125. For purposes of illustration and not limitation, as illustrated in FIG. 1, the first, third and Nth subscriber devices 115 include a power transmission circuit 125, while the second subscriber device 115 does not. However, at least one of the subscriber devices 115 includes the power transmission circuit 125. The power transmission circuit 125 is configured to transmit a portion of the power supplied by the power supply 120 of the subscriber device 115 to the network element 110 via the respective communication line 117. For purposes of illustration and not limitation, as illustrated in FIG. 1, the power transmission circuits 125 of the first, third and Nth subscriber devices 115 are configured to transmit a portion of the power supplied by the respective power supplies 120 to the second network element 110 via communication lines 117.

Any suitable portion of the power supplied by the power supply 120 can be transmitted to the network element 110 by the power transmission circuit 125, depending upon such factors as, for example, the amount of power supplied by the power supply 120, the amount of power required to run or otherwise operate the subscriber device 115, the amount of power required to run or otherwise operate the network element 110, and other like factors. According to an exemplary embodiment, approximately 5 watts to approximately 10 watts can be transmitted to the network element 110 by the power transmission circuit 125, although any suitable amount of power can be transmitted to the network element 110. Each of the power transmission circuits 125 of the subscriber devices 115 can transmit the same amount of power to the network element 110. According to an alternative exemplary embodiment, each power transmission circuit 125 can transmit or otherwise supply a different amount of power than other power transmission circuits 125. For example, each power transmission circuit 125 can supply a different amount of power between approximately 5 watts and approximately 10 watts to the network element 110 than other power transmission circuits 125.

The power transmission circuit 125 can comprise any suitable circuit, device or other power transmission means that is capable of supplying or otherwise providing a portion of the power from the power supply 120 to the network element 110. For example, a simplex powering scheme can be used for the power transmission circuit 125. FIG. 2 is a diagram illustrating the power transmission circuit 125 of the subscriber device 115, in accordance with an exemplary embodiment of the present invention. The power transmission circuit 125 can include a transformer 205 that is "split." FIG. 2 illustrates the secondary windings of the transformer 205 that are connected to the communication line 117 (e.g., to the ring and tip leads of a twisted pair). The primary windings of the transformer 205 can be located in the internals of the subscriber device 115. The primary windings and other internals of the subscriber device 115 have not been illustrated for purposes of clarity. The DC supply 210, electrically arranged between the split in the transformer 205, supplies the portion of the DC voltage that is siphoned off from or otherwise provided by the power supply 120 for transmission to the network element 110. Any suitable type of DC power supply can be used for DC supply 210 that is capable of receiving power from the power supply 120 and producing, generating or otherwise transmitting a portion of that power.

The DC supply 210 is electrically arranged in parallel across a capacitor 215 between the split in the transformer 205. The capacitor 215 has a suitably large capacitance so that the communicated AC voltage signal (e.g., the information signal) does not "see" the split in the transformer (e.g., so as not to affect the information signal), while the DC supply 210 does "see" the split. Thus, the information signals and power signals can be transmitted from the subscriber device 115 to the network element 110 using, for example, the same communication line 117. Other suitable power transmission circuits 125 can be used.

According to exemplary embodiments, the portions of power supplied from the subscriber devices 115 are aggregated to provide power for the network element 110. The network element 110 is configured to receive the various portions of power supplied from the at least subset of the plurality of subscriber devices 115 and to aggregate those portions for use in powering the network element 110. The network element 110 can use any suitable circuit, device or other means that is capable of receiving the various portions of power supplied from the subscriber devices 115 and aggregating those portions. For example, the network element 110 can include any suitable type of flyback or flyback-based converter or the like. Flyback converters and the like are well known in the art. In a flyback converter, the output voltage can be configured to have any polarity and amplitude with respect to the input voltage. More particularly, multiple inputs are readily available by adding secondary windings to the transformer used in the flyback converter. Thus, by adding suitable secondary windings to the transformer of a flyback converter in accordance with the number of subscriber devices 115 that are supplying power to the network element 110, the flyback converter can be used to receive the various portions of power and to aggregate those portions to power the network element 110.

As the number of subscriber devices 115 with power transmission circuits 125 is increased, more power is available to the network element 110. The amount of power required by the network element 110 will depend on, for example, the type of network element 110 and its corresponding power requirements. For example, many conventional network elements use a nominal input voltage of −48 volts DC. According to an exemplary embodiment, each subscriber device 115 with power transmission circuit 125 can supply a maximum of the SELV limit of 60 volts DC between leads or to earth (i.e., ground). According to an exemplary embodiment, both leads can be held at least somewhat negative with respect to ground to avoid corrosion, which frequently attacks leads biased positively. Limiting the maximum available voltage to, for example, 60 volts (or −60 volts, if appropriate) according to an exemplary embodiment does not adversely limit power availability, because of the very limited distances involved between the subscriber devices 115 and the network element 110, and the highly parallel structure between the network element 110 and the served subscribers. However, each subscriber device 115 with power transmission circuit 125 can supply any appropriate voltage, and the voltage can be the same as or different than the voltage supplied by other subscriber devices 115.

The addition of more subscriber devices 115 with power transmission circuits 125 can eventually result in more power being available than is needed by the network element 110. Once the network element 110 has received sufficient aggregated power to power itself, the additional or excess aggregated power can be used by the network element 110 for any suitable purpose. For example, according to an exemplary embodiment, the plurality of network elements 110 can be in electrical communication with each other (e.g., through existing subscriber loop pairs, dedicated large gauge leads, or the like). The network element 110 can be configured to distribute or otherwise supply a portion of the aggregated power (e.g., the excess power) to one or more of the other network elements to share or otherwise distribute power among the plurality of network elements 110. For example, as illustrated in FIG. 1, the second network element 110 can be in communication with the first network element 110 and the Mth network element 110. The second network element 110 can distribute the excess aggregated power to the first and Mth network elements 110, or to any other network element 110 to power those devices. If more than the required power is supplied to the first and Mth network elements 100, those network elements 110 can, in turn, supply the excess power to other network elements 110. Any or any combination of network elements 110 can thereby supply power to any or any combination of other network elements 110. Thus, exemplary embodiments of the present invention can be used to power each, any, or any combination of network elements 110 residing in the network either directly from the subscriber devices 115 that include power transmission circuits 125, or indirectly from another network element(s) 110.

According to an alternative exemplary embodiment, the excess aggregated power can be distributed back to the CO 105 or to any other suitable device or equipment that is capable of using the excess aggregated power. Alternatively, the network element 110 can command or otherwise signal the power transmission circuits 125 in certain subscriber devices 115 to turn off or reduce power output to vary, limit or otherwise manage the aggregated power being supplied to the network element 110 (e.g., using any suitable type of power management circuit or device).

As discussed previously, according to exemplary embodiments, the portions of power supplied by the subscriber devices 115 with power transmission circuits 125 can be aggregated to power the corresponding network element 110. However, according to an alternative exemplary embodiment, the aggregated power can be used in conjunction with or in addition to other power sources that supply power to the network element 110. For example, the system 100 can include at least one supplemental power supply in electrical communication with the network element 110. The at least one supplemental power supply can be configured to supply power to the network element to augment the aggregated power from the subset of the plurality of subscriber devices 115. For example, the at least one supplemental power supply can comprise a suitable battery for powering the network element 110. Additionally, the battery can be used by the network element 110 to feed power to the subscriber devices 115 during a blackout to provide, for example, 911 functionality for VoIP or emulated POTS. When the blackout ends, the subscriber devices 115 with power transmission circuits 125 can be used to supply aggregated power to power the network element 110 and to charge the battery.

For example, the at least one supplemental power supply can comprise a power source 150 associated with the CO 105. The CO 105 can be configured to supply power from the power source 150 to the network element 110 (e.g., the second network element 110 as illustrated in FIG. 1) via the communication connection 107. The power can be supplied to the network element 110 using a loop power feed via, for example, one of the subscriber loop pairs from the CO 105 in communication with the network element 110. According to such an alternative exemplary embodiment, the loop power feed from, for example, the CO 105 can be used to augment the aggregated power supplied from the subscriber devices 115. Accordingly, any suitable combination of aggregated power from the subscriber devices 115 with power transmission circuits 125 and power provided by the CO 105 or other appropriate source(s) can be used to power the network elements 110.

The reliability of any one subscriber device 115 may be low. However, according to exemplary embodiments, with many such devices (hundreds or thousands or more) in aggregation, the overall reliability of the system 100 can be high and very robust. The system 100 can provide a diverse power source that does not suffer from a single point of potential failure, as may occur with a local utility drop to the network element 110. Accordingly, with large numbers of subscriber devices 115 having power transmission circuits 125, a loss of a few or even many of such subscriber devices 115 would not substantially affect the aggregated power supplied to the network element 110.

Exemplary embodiments of the present invention can be used in any suitable communication or telecommunication network in which power or power signals can be transmitted or otherwise distributed among the elements or devices of the network. The network connections between the elements or devices can be comprised of twisted-pair lines, cable connections, or any other appropriate type of network communication lines suitable for carrying or otherwise communicating power.

FIG. 3 is a flowchart illustrating steps for supplying power in a communication network, in accordance with an exemplary embodiment of the present invention. In step 305, a plurality of subscriber devices communicate with a network element via respective communication lines. In step 310, power is supplied to each of the plurality of subscriber devices. In step 315, a portion of the power supplied to at least a subset of the plurality of subscriber devices is transmitted to the network element via the respective communication lines. In step 320, the portions of power supplied from the at least subset of the plurality of subscriber devices are aggregated to provide power to the network element.

In step 325, supplemental power can be supplied to the network element to augment the aggregated power from the at least subset of the plurality of subscriber devices. The network element can be in communication with a central office via a communication connection. The supplemental power supplied in step (e) can comprise a power source associated with the central office. In step 330, power can be supplied by the central office from the power source to the network element via the communication connection. A plurality of network elements can be in electrical communication with each other. Each network element can be in communication with a respective plurality of subscriber devices. In step 335, power can be shared or otherwise distributed among the plurality of network elements by supplying a portion of the aggregated power from respective subsets of the plurality of subscriber devices from each network element to at least one other network element.

One or more of the steps for supplying power in a communication network illustrated in FIG. 3 may be performed by a computer program that can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. As used herein, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a non-exhaustive list) of the computer-readable medium can include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CDROM).

It will be appreciated by those of ordinary skill in the art that the present invention can be embodied in various specific forms without departing from the spirit or essential characteristics thereof. The presently disclosed embodiments are considered in all respects to be illustrative and not restrictive. The scope of the invention is indicated by the appended claims, rather than the foregoing description, and all changes that come within the meaning and range of equivalence thereof are intended to be embraced.

All United States patents and applications, foreign patents, and publications discussed above are hereby incorporated herein by reference in their entireties.

What is claimed is:

1. A system for supplying power in a communication network, comprising:

a plurality of network elements in electrical communication with each other; and a plurality of subscriber devices in communication with at least one of the network elements; and wherein each network element is in communication with a respective plurality of subscriber devices, and wherein each of the plurality of subscriber devices is configured to communicate with the plurality of network elements via a respective communication line, wherein each of the plurality of subscriber devices comprises:

a power supply for supplying power to the subscriber device, wherein each subscriber device of at least a subset of the plurality of subscriber devices comprises:

a power transmission circuit in communication with the respective power supply, wherein the power transmission circuit is configured to transmit a portion of the power supplied by the power supply of the subscriber device to the plurality of network elements via the respective communication line, and wherein the portions of power supplied from the at least subset of the plurality of subscriber devices are aggregated to provide power for the plurality of network elements, and wherein each of the plurality of network elements is configured to directly supply, without using any other element in the communication network, a portion of the aggregated power from respective subsets of the plurality of subscriber devices to at least one other network element to share power among the plurality of network elements.

2. The system of claim 1, comprising:

at least one supplemental power supply in electrical communication with the plurality of network elements, wherein the at least one supplemental power supply is configured to supply power to the plurality of network elements to augment the aggregated power from the at least subset of the plurality of subscriber devices.

3. The system of claim 2, wherein each of the plurality of network elements is in communication with a central office via a communication connection, wherein the at least one supplemental power supply comprises a power source associated with the central office, and wherein the central office is configured to supply power from the power source to the plurality of network elements via the communication connection.

4. The system of claim 1, wherein each network element comprises a remote terminal.

5. The system of claim 1, wherein each of the plurality of subscriber devices comprises at least one of a set-top box, a modem, and a subscriber network interface device.

6. A system for supplying power to a network device in a telecommunication network, comprising:

a plurality of subscriber elements in communication with the network device, wherein each of the plurality of subscriber elements is configured to communicate telecommunication signals with the network device via respective communication lines, wherein each of the plurality of subscriber elements comprises:

a power source for supplying power to the subscriber element, wherein each subscriber element of at least a subset of the plurality of subscriber elements comprises:

a power transmitter circuit in communication with the respective power source, a plurality of network devices in electrical communication with each other, wherein each network device is in communication with a respective plurality of subscriber elements, wherein each network device is configured to directly supply, without using any other element in the communication network, a portion of the aggregated power from respective subsets of the plurality of subscriber elements to at least one other network device to distribute power among the plurality of network devices, wherein the power transmitter circuit is configured to transmit a portion of the power supplied by the power source of the subscriber element to the network device over the respective communication line, and wherein the portions of power supplied from the at least subset of the plurality of subscriber elements are aggregated to provide power to the network device.

7. The system of claim 6, comprising:

at least one additional power supply in electrical communication with the network device, wherein the at least one additional power supply is configured to supply power to the network device to augment the aggregated power from the at least subset of the plurality of subscriber elements.

8. The system of claim 7, wherein the network device is in communication with a central facility via a communication connection, wherein the at least one additional power supply comprises a power supply associated with the central facility, and wherein the central facility is configured to supply power from the power supply associated with central facility to the network device via the communication connection.

9. The system of claim 6, wherein the network device comprises a remote terminal.

10. The system of claim 6, wherein each of the plurality of subscriber elements comprises at least one of a set-top box, a modem, and a subscriber network interface device.

11. A system for supplying power to a network device in a telecommunication network, comprising:

a plurality of means for communicating with the network device; and a plurality of network devices in electrical communication with each other, wherein each of the plurality of communicating means is configured to communicate telecommunication signals with the network device via respective communication lines, wherein each of the plurality of communicating means comprises:

means for supplying power to the communicating means, wherein each communicating means of at least a subset of the plurality of communicating means comprises:

means for delivering power in communication with the respective power supplying means, wherein the power delivering means is configured to transmit a portion of the power supplied by the power supplying means of the communicating means to the network device over the respective communication line, and wherein the portions of power supplied from the at least subset of the plurality of communicating means are aggregated to provide power to the network device;

wherein each network device is in communication with a respective plurality of communicating means, and wherein each network device is configured to directly supply, without using any other element in the communication network, a portion of the aggregated power from respective subsets of the plurality of communicating means to at least one other network device to distribute power among the plurality of network devices.

12. The system of claim 11, comprising:

at least one additional means for providing power in electrical communication with the network device, wherein the at least one additional power providing means is configured to supply power to each network device to augment the aggregated power from the at least subset of the plurality of communicating means.

13. The system of claim 12, wherein each network device is in communication with a central facility via a communication connection, wherein the at least one additional power providing means comprises a power supply means associated with the central facility, and wherein the central facility is configured to supply power from the power supply means associated with central facility to the network device via the communication connection.

14. The system of claim 11, wherein each network device comprises a remote terminal.

15. The system of claim 11, wherein each of the plurality of communicating means comprises at least one of a set-top box, a modem, and a subscriber network interface device.

16. A method of supplying power in a communication network, comprising the step of:
   a.) communicating between a plurality of subscriber devices and a network element via respective communication lines;
   b.) supplying power to each of the plurality of subscriber devices;
   c.) transmitting a portion of the power supplied to at least a subset of the plurality of subscriber devices to the network element via the respective communication lines; and
   d.) aggregating the portions of power supplied from the at least subset of the plurality of subscriber devices to provide power to the network element;
   wherein a plurality of network elements are in electrical communication with each other,
   wherein each network element is in communication with a respective plurality of subscriber devices, and
   wherein the method further comprises the step of:
   e.) sharing power among the plurality of network elements by directly supplying, without using any other element in the communication network, a portion of the aggregated power from respective subsets of the plurality of subscriber devices from each network element to at least one other network element.

17. The method of claim 16, comprising the step of:
   e.) supplying supplemental power to each network element to augment the aggregated power from the at least subset of the plurality of subscriber devices.

18. The method of claim 17, wherein each network element is in communication with a central office via a communication connection,
   wherein the supplemental power supplied in step (e) comprises a power source associated with the central office, and
   wherein the method further comprises the step of:
   f.) supplying power by the central office from the power source to each network element via the communication connection.

19. The method of claim 16, wherein each network element comprises a remote terminal.

20. The method of claim 16, wherein each of the plurality of subscriber devices comprises at least one of a set-top box, a modem, and a subscriber network interface device.

21. The system of claim 3, wherein each of the plurality of network elements is configured to determine when it has received excess power than it needs and to notify, by outputting a command, the plurality of subscriber devices to either turn off or reduce an amount of power supplied to the respective network element.

22. The system of claim 13, wherein each of the plurality of network elements is configured to determine when it has received excess power than it needs and to notify, by outputting a command, the plurality of subscriber devices to either turn off or reduce an amount of power supplied to the respective network element.

23. The method of claim 18, further comprising:
   determining, by each of the plurality of network elements, when the respective network element has received excess power than it needs; and
   when the determining step determines that excess power has been received, notifying, by outputting a command, the plurality of subscriber devices to either turn off or reduce an amount of power supplied to the respective network element.

* * * * *